United States Patent
Kim et al.

(10) Patent No.: US 10,635,938 B1
(45) Date of Patent: Apr. 28, 2020

(54) LEARNING METHOD AND LEARNING DEVICE FOR ALLOWING CNN HAVING TRAINED IN VIRTUAL WORLD TO BE USED IN REAL WORLD BY RUNTIME INPUT TRANSFORMATION USING PHOTO STYLE TRANSFORMATION, AND TESTING METHOD AND TESTING DEVICE USING THE SAME

(71) Applicant: STRADVISION, INC., Pohang-si (KR)

(72) Inventors: Kye-Hyeon Kim, Seoul (KR);
Yongjoong Kim, Pohang-si (KR);
Hak-Kyoung Kim, Pohang-si (KR);
Woonhyun Nam, Pohang-si (KR);
SukHoon Boo, Anyang-si (KR);
Myungchul Sung, Pohang-si (KR);
Dongsoo Shin, Suwon-si (KR);
Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang-si (KR)

( * ) Notice: Subject to any disclaimer, the term of this patent is extended or adjusted under 35 U.S.C. 154(b) by 0 days.

(21) Appl. No.: 16/731,080

(22) Filed: Dec. 31, 2019

Related U.S. Application Data

(60) Provisional application No. 62/798,837, filed on Jan. 30, 2019.

(51) Int. Cl.
*G06K 9/62* (2006.01)
*G06N 3/04* (2006.01)
(Continued)

(52) U.S. Cl.
CPC ......... *G06K 9/6256* (2013.01); *G05D 1/0088* (2013.01); *G06K 9/00791* (2013.01);
(Continued)

(58) Field of Classification Search
CPC ............ G06K 9/6256; G06K 9/00791; G05D 1/0088; G06N 3/0418; G06N 3/0454; G06N 3/084
See application file for complete search history.

(56) References Cited

U.S. PATENT DOCUMENTS

| 10,297,070 B1 * | 5/2019 | Zhu ...................... G06K 9/6268 |
| 10,345,822 B1 * | 7/2019 | Parchami ............... B60W 30/09 |

(Continued)

Primary Examiner — Utpal D Shah
(74) Attorney, Agent, or Firm — Xsensus LLP

(57) ABSTRACT

A method for training a main CNN by using a virtual image and a style-transformed real image is provided. And the method includes steps of: (a) a learning device acquiring first training images; and (b) the learning device performing a process of instructing the main CNN to generate first estimated autonomous driving source information, instructing the main CNN to generate first main losses and perform backpropagation by using the first main losses, to thereby learn parameters of the main CNN, and a process of instructing a supporting CNN to generate second training images, instructing the main CNN to generate second estimated autonomous driving source information, instructing the main CNN to generate second main losses and perform backpropagation by using the second main losses, to thereby learn parameters of the main CNN.

26 Claims, 4 Drawing Sheets

(51) Int. Cl.
*G06K 9/00* (2006.01)
*G06N 3/08* (2006.01)
*G05D 1/00* (2006.01)
(52) U.S. Cl.
CPC ......... *G06N 3/0418* (2013.01); *G06N 3/0454* (2013.01); *G06N 3/084* (2013.01); *G05D 2201/0213* (2013.01)

(56) References Cited

U.S. PATENT DOCUMENTS

| | | | | |
|---|---|---|---|---|
| 2018/0129919 A1* | 5/2018 | Tang | ................... | G06K 9/4628 |
| 2018/0173942 A1* | 6/2018 | Kim | ................... | G06K 9/00302 |
| 2019/0012548 A1* | 1/2019 | Levi | ................... | G06K 9/6267 |
| 2019/0188141 A1* | 6/2019 | Ma | ..................... | G06F 12/0875 |
| 2019/0244060 A1* | 8/2019 | Dundar | ............. | G06K 9/00664 |
| 2019/0266439 A1* | 8/2019 | Nien | ....................... | G06K 9/66 |
| 2019/0332109 A1* | 10/2019 | Kolouri | ................ | B60W 10/20 |
| 2019/0332111 A1* | 10/2019 | Michalakis | ........ | G06K 9/00791 |

* cited by examiner

LEARNING METHOD AND LEARNING DEVICE FOR ALLOWING CNN HAVING TRAINED IN VIRTUAL WORLD TO BE USED IN REAL WORLD BY RUNTIME INPUT TRANSFORMATION USING PHOTO STYLE TRANSFORMATION, AND TESTING METHOD AND TESTING DEVICE USING THE SAME

CROSS REFERENCE OF RELATED APPLICATION

This present application claims the benefit of the earlier filing date of provisional patent application No. 62/798,837, filed Jan. 30, 2019, the entire contents of which being incorporated herein by reference.

FIELD OF THE DISCLOSURE

The present disclosure relates to a learning method and a learning device for use with an autonomous vehicle; and more particularly, to the learning method and the learning device for allowing a CNN having trained in a virtual world to be used in a real world, and a testing method and a testing device using the same.

BACKGROUND OF THE DISCLOSURE

Deep Convolution Neural Networks, or Deep CNN is the most core of the remarkable development in the field of Deep Learning. Though the CNN has been employed to solve character recognition problems in 1990s, it is not until recently that the CNN has become widespread in Machine Learning. For example, in 2012, the CNN significantly outperformed its competitors in an annual software contest, the ImageNet Large Scale Visual Recognition Challenge, and won the contest. After that, the CNN has become a very useful tool in the field of machine learning.

Recently, the CNNs are widely used in a field of an autonomous driving. The CNNs may perform an object detection, a semantic segmentation and a free space detection by processing its own inputted image in the field of the autonomous driving. Herein, for the CNNs to perform those functions, enormous size of training sets are necessary.

An obstacle of the approach shown above, using CNNs in the field of the autonomous driving, is that the training sets cost a lot. Further, in order to generate the training sets, although training images can be acquired automatically, heir corresponding GTs should be generated manually by people, resulting in much cost.

An alternative approach to overcome said obstacle is a virtual driving. In a virtual world simulated by a programmed computer, both of the training images and their corresponding GTs can be acquired automatically, resulting in lower cost.

However, this alternative approach has another obstacle that the training images acquired in the virtual world is different from images of real world, resulting in lower credibility on the CNNs trained in the virtual world.

SUMMARY OF THE DISCLOSURE

It is an object of the present disclosure to solve all the aforementioned problems.

It is another object of the present disclosure to provide a learning method for a runtime input transformation using a photo style transformation to thereby allow a CNN having trained in a virtual world to be used in a real world.

It is still another object of the present disclosure to provide a learning method for using both virtual images acquired from a virtual world and real images with same style as images to be used for testing, as training images.

It is still yet another object of the present disclosure to provide a learning method capable of training a CNN capable of an autonomous driving in a real world with a lower cost.

In accordance with one aspect of the present disclosure, there is provided a method for training a main Convolutional Neural Network (CNN) to be used for performing an autonomous driving, by using at least one virtual image and at least one style-transformed real image, which has been transformed from at least one real image to an image whose style corresponds to a style of an image of a prescribed virtual world, including steps of: (a) a learning device acquiring at least part of one or more first training images corresponding to a virtual driving of a virtual vehicle in the prescribed virtual world; and (b) the learning device performing, (b1) as a first training process, processes of (i) instructing a main convolutional layer and an output layer in the main CNN to generate one or more pieces of first estimated autonomous driving source information by referring to the first training images, (ii) instructing a main loss layer in the main CNN to (ii-1) generate one or more first main losses by referring to the first estimated autonomous driving source information and its corresponding first Ground-Truth (GT) autonomous driving source information and (ii-2) perform backpropagation by using the first main losses, to thereby learn at least part of parameters of the main CNN, and (b2) as a second training process, processes of (i) instructing a supporting CNN to generate one or more second training images by referring to at least one first base image corresponding to the first training images and one or more second base images corresponding to a real driving of a real vehicle in a real world, (ii) instructing the main convolutional layer and the output layer in the main CNN to generate one or more pieces of second estimated autonomous driving source information by referring to the second training images, (iii) instructing the main loss layer in the main CNN to (iii-1) generate one or more second main losses by referring to the second estimated autonomous driving source information and its corresponding second Ground-Truth (GT) autonomous driving source information and (iii-2) perform backpropagation by using the second main losses, to thereby learn at least part of parameters of the main CNN.

As one example, the step of (b2) includes steps of: (b21) the learning device instructing a supporting convolutional layer in the supporting CNN to perform (i) a process of generating one or more specific style feature maps by applying at least one supporting CNN operation to the first base image, and (ii) a process of generating one or more specific content feature maps by applying the supporting CNN operation to a specific second base image among the second base images; (b22) the learning device (i) instructing the supporting convolutional layer in the supporting CNN to generate one or more first update feature maps by applying the supporting CNN operation to a noise image and (ii) instructing a supporting loss layer in the supporting CNN to (ii-1) generate at least one first update loss by using the first update feature maps, along with the specific style feature maps and the specific content feature maps, and (ii-2) generate at least one first update image by updating the noise image through using the first update loss; (b23) the learning device (i) instructing the supporting convolutional layer in the supporting CNN to generate one or more K-th update feature maps by applying the supporting CNN operation to a (K−1)-th update image and (ii) instructing the supporting loss layer in the supporting CNN to (ii-1) generate at least one K-th update loss by using the K-th update feature maps, along with the specific style feature maps and the specific content feature maps, and (ii-2) generate at least one K-th update image by updating the (K−1)-th image through using the K-th update loss wherein K is an integer from 1 to N; and (b24) the learning device outputting an N-th update image, which has been generated by performing the steps of (b22) and (b23), as a specific second training image.

As one example, at the step of (b22), the learning device instructs the supporting loss layer to perform (i) a process of generating one or more first style losses by using the first update feature maps and the specific style feature maps and (ii) a process of generating one or more first content losses by using the first update feature maps and the specific content feature maps, to thereby generate the first update loss including the first style losses and the first content losses.

As one example, at the step of (b22), the learning device instructs the supporting loss layer to update the noise image by using the first update loss in a gradient-descent scheme, to thereby (i) make a style characteristic of the first update image to be more similar to that of the specific first base image than that of the noise image, (ii) make a content characteristic of the first update image to be more similar to that of the specific second base image than that of the noise image.

As one example, at the step of (b), the learning device (i) instructs the main CNN to perform the first training process by using a specific number of the first training images and their corresponding said first GT autonomous driving source information to learn the parameters thereof, and then (ii) instructs the main CNN to perform the second training process by using the second training images and their corresponding said second GT autonomous driving source information to fine-tune the parameters thereof.

As one example, at the step of (b), the learning device (i) instructs the main CNN to perform the first training process by using one or more specific first training images among the first training images whose ratio of its number to a specific number is prescribed and their corresponding part of the first GT autonomous driving source information to initially learn the parameters thereof, and then (ii) instructs the main CNN to perform the second training process by using the second training images and their corresponding second GT autonomous driving source information along with the first training images and their corresponding first GT autonomous driving source information to relearn the parameters thereof.

As one example, at the step of (b2), the first base image is selected among the first training images and the second base images are acquired through at least one camera installed to the real vehicle which photographs real driving circumstance corresponding to the real vehicle, and wherein, if said at least one first base image is singular, each of the second training images corresponds to each of the second base images.

As one example, at the step of (b1), the learning device instructs (i) one or more main convolutional neurons of the main convolutional layer in the main CNN to repeat processes of (i-1) applying at least one main convolutional operation to its inputted value by using its own parameter and (i-2) delivering its output to its next autonomous driving neuron, to thereby generate a first autonomous driving feature map, and (ii) the output layer in the main CNN to generate the first estimated autonomous driving source information by applying at least one output operation to the first autonomous driving feature map, to thereby apply the main CNN operation to the first training images.

In accordance with another aspect of the present disclosure, there is provided a method for testing a main Convolutional Neural Network (CNN) to be used for performing an autonomous driving, trained by using at least one virtual image and at least one style-transformed real image, which has been transformed from at least one real image to an image whose style corresponds to a style of an image of a prescribed virtual world, including steps of: (a) on condition that (1) a learning device has acquired at least part of one or more first training images corresponding to a virtual driving for training of a virtual vehicle for training in the prescribed virtual world for training; and (2) the learning device has performed, (b1) as a first training process, processes of (i) instructing a main convolutional layer and an output layer in the main CNN to generate one or more pieces of first estimated autonomous driving source information for training by referring to the first training images, (ii) instructing a main loss layer in the main CNN to (ii-1) generate one or more first main losses by referring to the first estimated autonomous driving source information for training and its corresponding first Ground-Truth (GT) autonomous driving source information and (ii-2) perform backpropagation by using the first main losses, to thereby learn at least part of parameters of the main CNN, and (b2) as a second training process, processes of (i) instructing a supporting CNN to generate one or more second training images by referring to at least one first base image for training corresponding to the first training images and one or more second base images for training corresponding to a real driving for training of a real vehicle for training in a real world, (ii) instructing the main convolutional layer and the output layer in the main CNN to generate one or more pieces of second estimated autonomous driving source information for training by referring to the second training images, (iii) instructing the main loss layer in the main CNN to (iii-1) generate one or more second main losses by referring to the second estimated autonomous driving source information for training and its corresponding second Ground-Truth (GT) autonomous driving source information and (iii-2) perform backpropagation by using the second main losses, to thereby learn at least part of parameters of the main CNN, a testing device instructing the supporting CNN to generate a testing image by referring to (i) at least one first base image for testing corresponding to a virtual driving for testing of a virtual vehicle for testing in a virtual world for testing, and (ii) at least one second base image for testing acquired through at least one camera for testing installed to a real vehicle for testing in the real world, interworking with the testing device; (b) the testing device instructing the main convolutional layer and the output layer in the main CNN to generate estimated autonomous driving source information for testing by referring to the testing image.

As one example, the method further includes a step of: (c) the testing device delivering the estimated autonomous driving source information for testing to an autonomous driving application module, to thereby support an autonomous driving of the real vehicle for testing.

As one example, the step of (a) includes steps of: (a1) the testing device instructing a supporting convolutional layer in the supporting CNN to perform (i) a process of generating one or more style feature maps for testing by applying at least one supporting CNN operation to the first base image for testing, and (ii) a process of generating one or more content feature maps for testing by applying the supporting CNN operation to the second base image for testing; (a2) the testing device (i) instructing the supporting convolutional layer in the supporting CNN to generate one or more first update feature maps for testing by applying the supporting CNN operation to a noise image for testing and (ii) instructing a supporting loss layer in the supporting CNN to (ii-1) generate at least one first update loss for testing by using the first update feature maps for testing, along with the style feature maps for testing and the content feature maps for testing, and (ii-2) generate at least one first update image for testing by updating the noise image for testing through using the first update loss for testing; (a3) the testing device (i) instructing the supporting convolutional layer in the supporting CNN to generate one or more K-th update feature maps for testing by applying the supporting CNN operation to a (K−1)-th update image for testing and (ii) instructing the supporting loss layer in the supporting CNN to (ii-1) generate at least one K-th update loss for testing by using the K-th update feature maps for testing, along with the style feature maps for testing and the content feature maps for testing, and (ii-2) generate at least one K-th update image for testing by updating the (K−1)-th image for testing through using the K-th update loss for testing wherein K is an integer from 1 to N; and (a4) the testing device outputting an N-th update image for testing, which has been generated by performing the steps of (a2) and (a3), as the testing image.

As one example, after a step of (b), the method further includes a step of: (d) the testing device, if an additional second base image for testing is acquired through the camera for testing at a (T+1)-th timing after a T-th timing when the second base image for testing has been acquired, instructing the supporting CNN to (i) generate an additional testing image by referring to the first base image for testing and the additional second base image for testing and (ii) generate additional estimated autonomous driving source information for testing by using the additional testing image.

As one example, at the step of (b), the testing device instructs (i) one or more main convolutional neurons of the main convolutional layer in the main CNN to repeat processes of (i-1) applying at least one main convolutional operation to its inputted value by using its own parameter and (i-2) delivering its output to its next autonomous driving neuron, to thereby generate a autonomous driving feature map for testing, and (ii) the output layer in the main CNN to generate the estimated autonomous driving source information for testing by applying at least one output operation to the autonomous driving feature map for testing, to thereby apply the main CNN operation to the testing images.

In accordance with still another aspect of the present disclosure, there is provided a device for training a main Convolutional Neural Network (CNN) to be used for performing an autonomous driving, by using at least one virtual image and at least one style-transformed real image, which has been transformed from at least one real image to an image whose style corresponds to a style of an image of a prescribed virtual world, including: at least one memory that stores instructions; and at least one processor configured to execute the instructions to perform processes of: (I) acquiring at least part of one or more first training images corresponding to a virtual driving of a virtual vehicle in the prescribed virtual world; and (II) performing, (I1) as a first training process, a process of (i) instructing a main convolutional layer and an output layer in the main CNN to generate one or more pieces of first estimated autonomous driving source information by referring to the first training images, (ii) instructing a main loss layer in the main CNN to (ii-1) generate one or more first main losses by referring to the first estimated autonomous driving source information and its corresponding first Ground-Truth (GT) autonomous driving source information and (ii-2) perform backpropagation by using the first main losses, to thereby learn at least part of parameters of the main CNN, and (I2) as a second training process, a process of (i) instructing a supporting CNN to generate one or more second training images by referring to at least one first base image corresponding to the first training images and one or more second base images corresponding to a real driving of a real vehicle in a real world, (ii) instructing the main convolutional layer and the output layer in the main CNN to generate one or more pieces of second estimated autonomous driving source information by referring to the second training images, (iii) instructing the main loss layer in the main CNN to (iii-1) generate one or more second main losses by referring to the second estimated autonomous driving source information and its corresponding second Ground-Truth (GT) autonomous driving source information and (iii-2) perform backpropagation by using the second main losses, to thereby learn at least part of parameters of the main CNN.

As one example, the process of (I2) includes processes of: (I21) instructing a supporting convolutional layer in the supporting CNN to perform (i) a process of generating one or more specific style feature maps by applying at least one supporting CNN operation to the first base image, and (ii) a process of generating one or more specific content feature maps by applying the supporting CNN operation to a specific second base image among the second base images; (I22) (i) instructing the supporting convolutional layer in the supporting CNN to generate one or more first update feature maps by applying the supporting CNN operation to a noise image and (ii) instructing a supporting loss layer in the supporting CNN to (ii-1) generate at least one first update loss by using the first update feature maps, along with the specific style feature maps and the specific content feature maps, and (ii-2) generate at least one first update image by updating the noise image through using the first update loss; (I23) (i) instructing the supporting convolutional layer in the supporting CNN to generate one or more K-th update feature maps by applying the supporting CNN operation to a (K−1)-th update image and (ii) instructing the supporting loss layer in the supporting CNN to (ii-1) generate at least one K-th update loss by using the K-th update feature maps, along with the specific style feature maps and the specific content feature maps, and (ii-2) generate at least one K-th update image by updating the (K−1)-th image through using the K-th update loss wherein K is an integer from 1 to N; and (I24) outputting an N-th update image, which has been generated by performing the processes of (I22) and (I23), as a specific second training image.

As one example, at the process of (I22), the processor instructs the supporting loss layer to perform (i) a process of generating one or more first style losses by using the first update feature maps and the specific style feature maps and (ii) a process of generating one or more first content losses by using the first update feature maps and the specific content feature maps, to thereby generate the first update loss including the first style losses and the first content losses.

As one example, at the process of (I22), the processor instructs the supporting loss layer to update the noise image by using the first update loss in a gradient-descent scheme, to thereby (i) make a style characteristic of the first update image to be more similar to that of the specific first base image than that of the noise image, (ii) make a content characteristic of the first update image to be more similar to that of the specific second base image than that of the noise image.

As one example, at the process of (II), the processor (i) instructs the main CNN to perform the first training process by using a specific number of the first training images and their corresponding said first GT autonomous driving source information to learn the parameters thereof, and then (ii) instructs the main CNN to perform the second training process by using the second training images and their corresponding said second GT autonomous driving source information to fine-tune the parameters thereof.

As one example, at the process of (II), the processor (i) instructs the main CNN to perform the first training process by using one or more specific first training images among the first training images whose ratio of its number to a specific number is prescribed and their corresponding part of the first GT autonomous driving source information to initially learn the parameters thereof, and then instructs the main CNN to perform the second training process by using the second training images and their corresponding second GT autonomous driving source information along with the first training images and their corresponding first GT autonomous driving source information to relearn the parameters thereof.

As one example, at the process of (I2), the first base image is selected among the first training images and the second base images are acquired through at least one camera installed to the real vehicle which photographs real driving circumstance corresponding to the real vehicle, and wherein, if said at least one first base image is singular, each of the second training images corresponds to each of the second base images.

As one example, at the process of (I1), the processor instructs (i) one or more main convolutional neurons of the main convolutional layer in the main CNN to repeat processes of (i-1) applying at least one main convolutional operation to its inputted value by using its own parameter and (i-2) delivering its output to its next autonomous driving neuron, to thereby generate a first autonomous driving feature map, and (ii) the output layer in the main CNN to generate the first estimated autonomous driving source information by applying at least one output operation to the first autonomous driving feature map, to thereby apply the main CNN operation to the first training images.

In accordance with still yet another aspect of the present disclosure, there is provided a device for testing a main Convolutional Neural Network (CNN) to be used for performing an autonomous driving, trained by using at least one virtual image and at least one style-transformed real image, which has been transformed from at least one real image to an image whose style corresponds to a style of an image of a prescribed virtual world, including: at least one memory that stores instructions; and at least one processor configured to execute the instructions to perform processes of: (I) on condition that (1) a learning device has acquired at least part of one or more first training images corresponding to a virtual driving for training of a virtual vehicle for training in the prescribed virtual world for training; and (2) the learning device has performed, (b1) as a first training process, a process of (i) instructing a main convolutional layer and an output layer in the main CNN to generate one or more pieces of first estimated autonomous driving source information for training by referring to the first training images, (ii) instructing a main loss layer in the main CNN to (ii-1) generate one or more first main losses by referring to the first estimated autonomous driving source information for training and its corresponding first Ground-Truth (GT) autonomous driving source information and (ii-2) perform backpropagation by using the first main losses, to thereby learn at least part of parameters of the main CNN, and (b2) as a second training process, a process of (i) instructing a supporting CNN to generate one or more second training images by referring to at least one first base image for training corresponding to the first training images and one or more second base images for training corresponding to a real driving for training of a real vehicle for training in a real world, (ii) instructing the main convolutional layer and the output layer in the main CNN to generate one or more pieces of second estimated autonomous driving source information for training by referring to the second training images, (iii) instructing the main loss layer in the main CNN to (iii-1) generate one or more second main losses by referring to the second estimated autonomous driving source information for training and its corresponding second Ground-Truth (GT) autonomous driving source information and (iii-2) perform backpropagation by using the second main losses, to thereby learn at least part of parameters of the main CNN, instructing the supporting CNN to generate a testing image by referring to (i) at least one first base image for testing corresponding to a virtual driving for testing of a virtual vehicle for testing in a virtual world for testing, and (ii) at least one second base image for testing acquired through at least one camera for testing installed to a real vehicle for testing in the real world, interworking with the testing device; (II) instructing the main convolutional layer and the output layer in the main CNN to generate estimated autonomous driving source information by referring to the testing image.

As one example, the processor further performs a process of: (III) delivering the estimated autonomous driving source information for testing to an autonomous driving application module, to thereby support an autonomous driving of the real vehicle for testing.

As one example, the process of (I) includes processes of: (I1 instructing a supporting convolutional layer in the supporting CNN to perform (i) a process of generating one or more style feature maps for testing by applying at least one supporting CNN operation to the first base image for testing, and (ii) a process of generating one or more content feature maps for testing by applying the supporting CNN operation to the second base image for testing; (I2) (i) instructing the supporting convolutional layer in the supporting CNN to generate one or more first update feature maps for testing by applying the supporting CNN operation to a noise image for testing and (ii) instructing a supporting loss layer in the supporting CNN to (ii-1) generate at least one first update loss for testing by using the first update feature maps for testing, along with the style feature maps for testing and the content feature maps for testing, and (ii-2) generate at least one first update image for testing by updating the noise image for testing through using the first update loss for testing; (I3) (i) instructing the supporting convolutional layer in the supporting CNN to generate one or more K-th update feature maps for testing by applying the supporting CNN operation to a (K−1)-th update image for testing and (ii) instructing the supporting loss layer in the supporting CNN to (ii-1) generate at least one K-th update loss for testing by using the K-th update feature maps for testing, along with the style feature maps for testing and the content feature maps for testing, and (ii-2) generate at least one K-th update image for testing by updating the (K−1)-th image for testing through using the K-th update loss for testing wherein K is an integer from 1 to N; and (I4) outputting an N-th update image for testing, which has been generated by performing the processes of (a2) and (a3), as the testing image.

As one example, after a process of (II), the processor further performs a process of: (IV) if an additional second base image for testing is acquired through the camera for testing at a (T+1)-th timing after a T-th timing when the second base image for testing has been acquired, instructing the supporting CNN to (i) generate an additional testing image by referring to the first base image for testing and the additional second base image for testing and (ii) generate additional estimated autonomous driving source information for testing by using the additional testing image.

As one example, at the process of (II), the processor instructs (i) one or more main convolutional neurons of the main convolutional layer in the main CNN to repeat processes of (i-1) applying at least one main convolutional operation to its inputted value by using its own parameter and (i-2) delivering its output to its next autonomous driving neuron, to thereby generate a autonomous driving feature map for testing, and (ii) the output layer in the main CNN to generate the estimated autonomous driving source information for testing by applying at least one output operation to the autonomous driving feature map for testing, to thereby apply the main CNN operation to the testing images.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
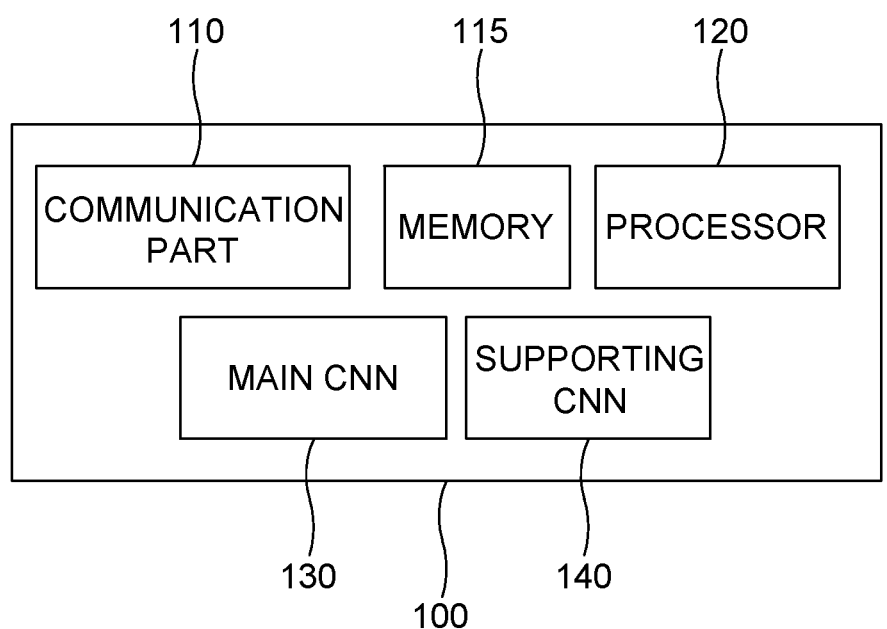
FIG. 1 is a drawing schematically illustrating a configuration of a learning device performing a learning method for allowing a CNN for autonomous driving trained in a virtual world to be used in a real world by a runtime input transformation using a photo style transformation in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

FIG. 1 is a drawing schematically illustrating a configuration of a learning device performing a learning method for allowing a CNN for autonomous driving having trained in a virtual world to be used in a real world by a runtime input transformation using a photo style transformation in accordance with one example embodiment of the present disclosure.

By referring to FIG. 1, the learning device 100 may include a main Convolutional Neural Network (CNN) 130 to be used for the autonomous driving, a supporting CNN 140, to be described later. Processes of input/output and computations of the main CNN 130 and the supporting CNN 140 may be respectively performed by at least one communication part 110 and at least one processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the learning device 100 does not exclude an integrated device including any combination of a processor, a memory, a medium, or any other computing components.

So far the configuration of the learning device 100 performing in accordance with one example embodiment of the present disclosure has been explained. Below, the learning method performed by the learning device 100 will be explained.

Figure 2:
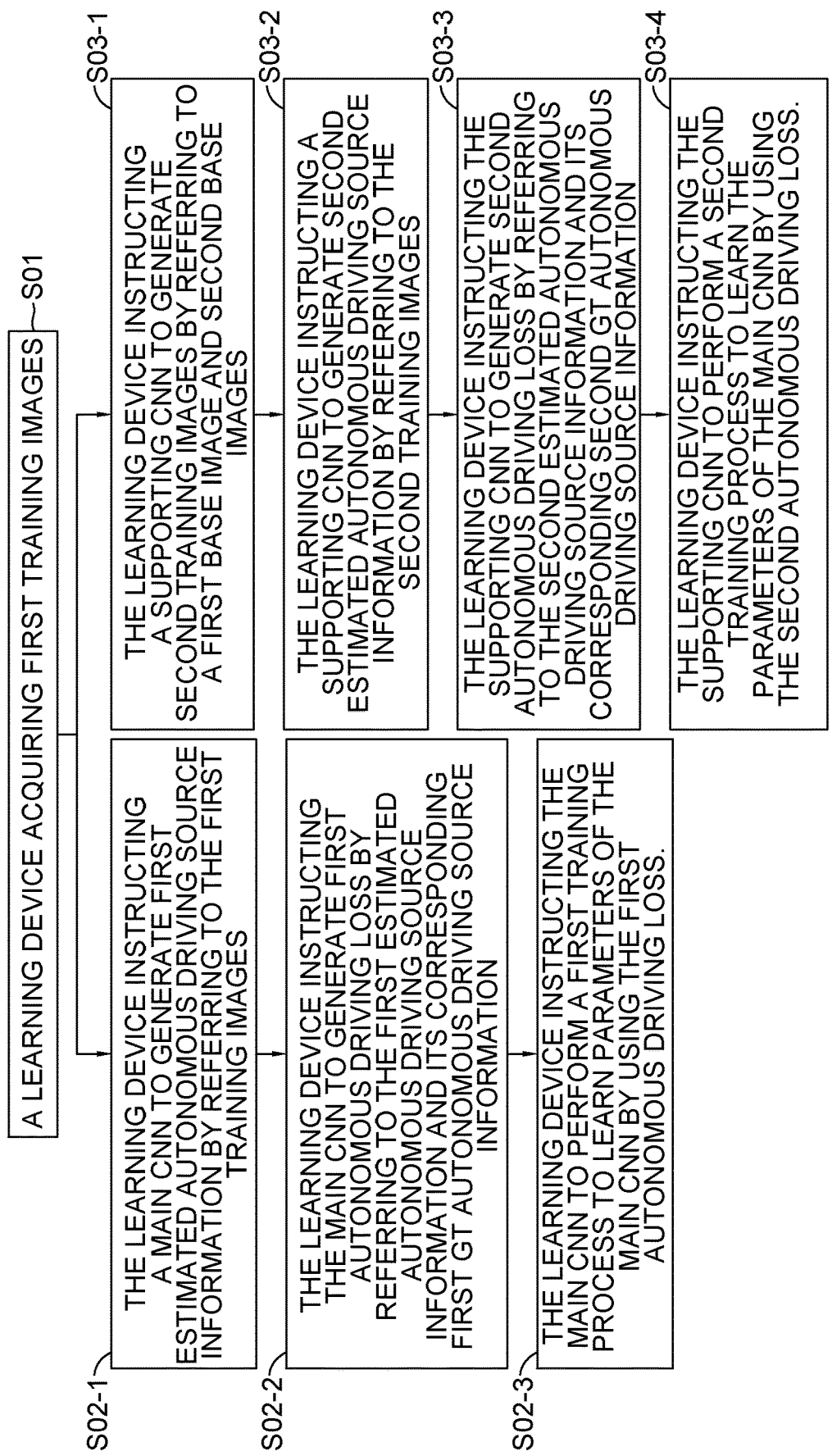
FIG. 2 is a drawing schematically illustrating a flow of the learning method for training the CNN for autonomous driving trained in the virtual world to be used in the real world by the runtime input transformation using the photo style transformation in accordance with one example embodiment of the present disclosure.

By referring to FIG. 2, at a step of S01, the learning device 100 may acquire at least part of one or more first training images. Thereafter, the learning device 100 may perform two processes in parallel.

First, at a step of S02-1, the learning device 100 may instruct the main CNN 130 to generate first estimated autonomous driving source information by referring to the first training images. Then, at a step of S02-2, the learning device 100 may instruct the main CNN 130 to generate a first main loss by referring to the first estimated autonomous driving source information and its corresponding first Ground-Truth (GT) autonomous driving source information, and, at a step of S02-3, the learning device 100 may instruct the main CNN 130 to learn at least part of parameters in the main CNN 130. Such steps of S02 may denote a first training process.

Second, at a step of S03-1, the learning device 100 may instruct the supporting CNN 140 to generate one or more second training images by referring to at least one first base image and one or more second base images. And, at a step of S03-2, the learning device 100 may instruct the supporting CNN 140 to generate second estimated autonomous driving source information by referring to the second training images. Then, at a step of S03-3, the learning device 100 may instruct the supporting CNN 140 to generate a second main loss by referring to the second estimated autonomous driving source information and its corresponding second GT autonomous driving source information, and, at a step of S03-4, the learning device 100 may instruct supporting CNN 140 to learn at least part of parameters in the main CNN 130 by using the second main loss. Such steps of S02 may denote a second training process.

Hereinafter, the first training process and the second training process will be explained in detail.

Regarding the first training process, the learning device 100 may instruct a main convolutional layer and an output layer in the main CNN 130 to generate one or more pieces of first estimated driving source information by referring to the first training images, which corresponds to a virtual driving of a virtual vehicle in a prescribed virtual world. Herein, the first training images may be acquired by photographing the virtual world, simulated by a programmed computer, from a view of the virtual vehicle. Thus, those may have a higher chroma, a higher contrast, relatively omitted details, and relatively unrealistic route of rays, comparing to images acquired by photographing a real world. The first estimated autonomous driving source information may be a kind of reference information to be used for supporting the autonomous driving, thus it may be delivered to an autonomous driving application module in a test process to be explained later, in order to support the autonomous driving. As an example, the first estimated autonomous driving source information may include segmentation information on the first training images. As another example, it may include object detection information thereon. However, a scope of the present disclosure may not be limited thereto.

In order to generate such first estimated autonomous driving source information, the learning device 100 may instruct one or more main convolutional neurons of the main convolutional layer in the main CNN 130 to repeat processes of (i-1) applying at least one main convolutional operation to its inputted value by using its own parameter and (i-2) delivering its output to its next autonomous driving neuron, to thereby generate a first autonomous driving feature map. Then, the learning device 100 may instruct the output layer in the main CNN 130 to generate the first estimated autonomous driving source information by applying at least one output operation to the first autonomous driving feature map. Herein, according to said example in which the first estimated driving source information includes the segmentation information, the output layer may be a deconvolutional layer, and the output operation may be a deconvolutional operation. Otherwise, according to said another example in which the first estimated driving source information includes the object detection information, the output layer may include a pooling layer and a Fully-Connected (FC) layer, and the output operation may include a pooling operation and an FC network operation.

So far the first training process has been explained. Below, the second training process will be explained.

The second training process is related to the second training images. And, the second training images may have been generated by the supporting CNN 140, using the first base image and the second base images. Herein, the first base image may correspond to the first training images, i.e., images on the virtual world, and the second base images may correspond to images acquired during a real driving of a real vehicle in the real world. As an example, the first base image may be selected among the first training images, and the second base images may be selected among images on real driving circumstances, acquired through cameras on the real vehicle. In case the first base image is singular, each of the second training images may correspond to each of the second base images.

After the first base image and the second base images are acquired, the learning device 100 may instruct a supporting convolutional layer in the supporting CNN 140 to perform (i) a process of generating one or more specific style feature maps by applying at least one supporting CNN operation to the first base image and (ii) a process of generating one or more specific content feature maps by applying the supporting CNN operation to a specific second base image among the second base images. The two process are independent, thus those may be performed in parallel. Each of the specific style feature maps and the specific content feature maps, to be explained specifically later, may be each of a reference feature map for a style of a specific second training image and a reference feature map for a content thereof.

Thereafter, the learning device 100 may instruct the supporting convolutional layer in the supporting CNN 140 to generate one or more first update feature maps by applying the supporting CNN operation to a noise image and instruct a supporting loss layer in the supporting CNN 140 to generate at least one first update loss by using the first update feature maps, along with the specific style feature maps and the specific content feature maps. Herein, the noise image may be a background image to be used for generating the specific second training image. To be simple, the noise image may be something like a canvas used for drawing a picture.

Specifically, the learning device 100 may instruct the supporting loss layer to perform (i) a process of generating one or more first style losses by using the first update feature maps and the specific style feature maps and (ii) a process of generating one or more first content losses by using the first update feature maps and the specific content feature maps. Then, the learning device 100 may instruct the supporting loss layer to sum up the first style losses and the first content losses, to generate the first update loss. Herein, in order to generate the first style losses, the supporting loss layer may apply a style operation to the first update feature maps to generate first adjusted update feature maps, and then calculate differences between the first adjusted update feature maps and the specific style feature maps. Also, in order to generate the first content losses, the supporting loss layer may calculate differences between the first update feature maps and the specific content feature maps.

Thereafter, the learning device may instruct the supporting loss layer to generate at least one first update image by updating the noise image by using the first update loss. Specifically, the supporting loss layer may update the noise image by using the first update loss in a gradient-descent scheme. By performing such updating process, a style characteristic of the first update image may become more similar to that of the specific first base image than that of the noise image. Also, a content characteristic thereof may become more similar to that of the specific second base image than that of the noise image.

Figure 3:
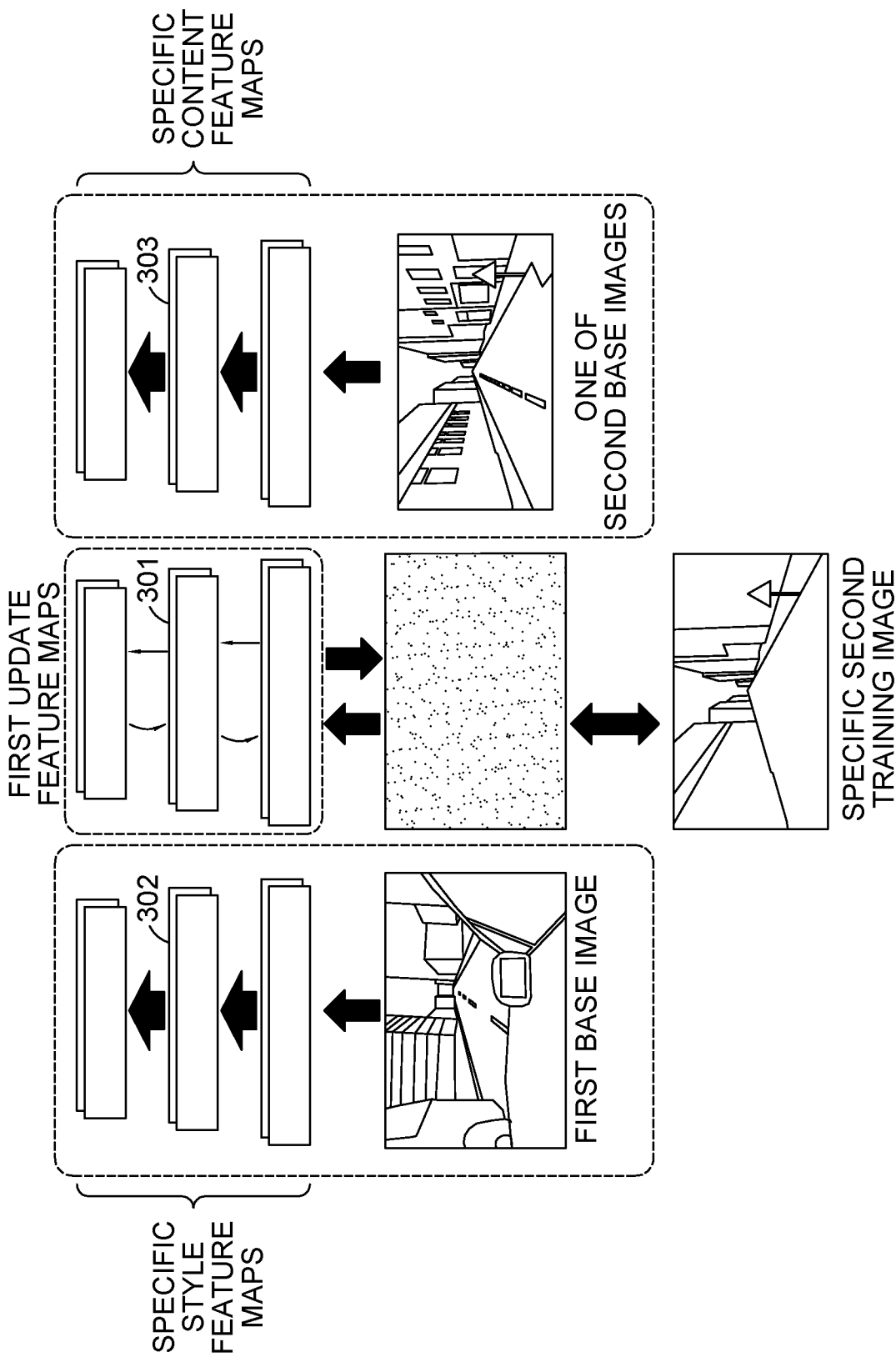
FIG. 3 is a drawing schematically illustrating a process of generating second training images to be used for the learning method for allowing the CNN for autonomous driving trained in the virtual world to be used in the real world by the runtime input transformation using the photo style transformation in accordance with one example embodiment of the present disclosure.

In order to explain the above processes performed by the supporting CNN 140 more specifically, FIG. 3 will be referred to.

FIG. 3 is a drawing schematically illustrating a process of generating second training images to be used for the learning method for allowing the CNN for autonomous driving having trained in the virtual world to be used in the real world by the runtime input transformation using the photo style transformation in accordance with one example embodiment of the present disclosure.

By referring to FIG. 3, it can be seen that one of the first style losses has been generated by calculating a difference between one of the first update feature maps 301 and one of the specific style feature maps 302, and one of the first content losses has been generated by using said one of the first update feature maps 301 and one of the specific content feature maps 303. Further, it can be seen that the noise image has been updated by using the first update loss.

By repeating the above processes, a second update image can be generated by updating the first update image, a third update image can be generated by updating the second update image, and further an N-th update image can be generated, and it may be outputted as the specific second training image. Herein, N may be prescribed integer. More specifically, the learning device 100 may (i) instruct the supporting convolutional layer in the supporting CNN 140 to generate one or more K-th update feature maps by applying the supporting CNN operation to a (K−1)-th update image and (ii) instruct the supporting loss layer in the supporting CNN to (ii-1) generate at least one K-th update loss by using the K-th update feature maps, along with the specific style feature maps and the specific content feature maps, and (ii-2) generate at least one K-th update image by updating the (K−1)-th image through the K-th update loss wherein K is an integer from 1 to N.

Such process of generating the specific second training image is similar to an image style transferring process of a thesis named "Image Style Transfer Using Convolutional Neural Networks" provided by Gatys et al. in 2016, famous for their results of adjusting an arbitrary picture to be looked like Gogh's one. Thus, a person in the art may easily understand the above explanation by referring to said thesis.

After the second training images including the specific second training image are generated, those can be used for training the main CNN 130 like the first training images. Briefly, as the second training process, the learning device 100 may (i) instruct the main convolutional layer and the output layer in the main CNN 130 to generate one or more pieces of second estimated autonomous driving source information by referring to the second training images, (ii) instruct the main loss layer in the main CNN 130 to (ii-1) generate one or more second main losses by referring to the second estimated autonomous driving source information and its corresponding second GT autonomous driving source information and (ii-2) perform backpropagation by using the second main losses, to thereby learn at least part of parameters of the main CNN 130. Such second training process is similar to the first one, thus more specific explanation is omitted.

So far the first training process and the second training process have been explained. Below a correlation between those two will be explained.

First, as an example embodiment, the first training process and the second training process may be performed at the same time. That is, after the first training images have been acquired, the second training images are generated, and those two kinds of training images may be used for training at least part of the parameters of the main CNN 130.

Otherwise, as another example embodiment, the first training process may be performed first to learn at least part of the parameters, and then the second training process may be performed to fine-tune the at least part of the parameters. That is, the learning device 100 may (i) instruct the main CNN 130 to perform the first training process by using a specific number of the first training images and their corresponding said first GT autonomous driving source information to learn the parameters thereof, and then (ii) instruct the main CNN 130 to perform the second training process by using the second training images and their corresponding said second GT autonomous driving source information to fine-tune the parameters thereof. Herein, the specific number may be a prescribed number which is enough for training the main CNN 130.

As still another example embodiment, the first training process may be performed first to initially learn at least of the parameters by using some of the first training images, and then the second training process may be performed by further using the first training images and the second training images to relearn said at least part of the parameters. That is, the learning device 100 may instruct the main CNN 130 to perform the first training process by using one or more specific first training images among the first training images and their corresponding part of the first GT autonomous driving source information to initially learn the parameters thereof, and then instruct the main CNN 130 to perform the second training process by using the second training images and their corresponding second GT autonomous driving source information along with the first training images and their corresponding first GT autonomous driving source information to relearn the parameters thereof. Herein, a ratio of the number of the specific first training images to the specific number, which has been set by a manager, may be prescribed.

Below, how the main CNN 130, which has been trained by performing the above processes, is tested will be explained, by referring to FIG. 4.

Figure 4:
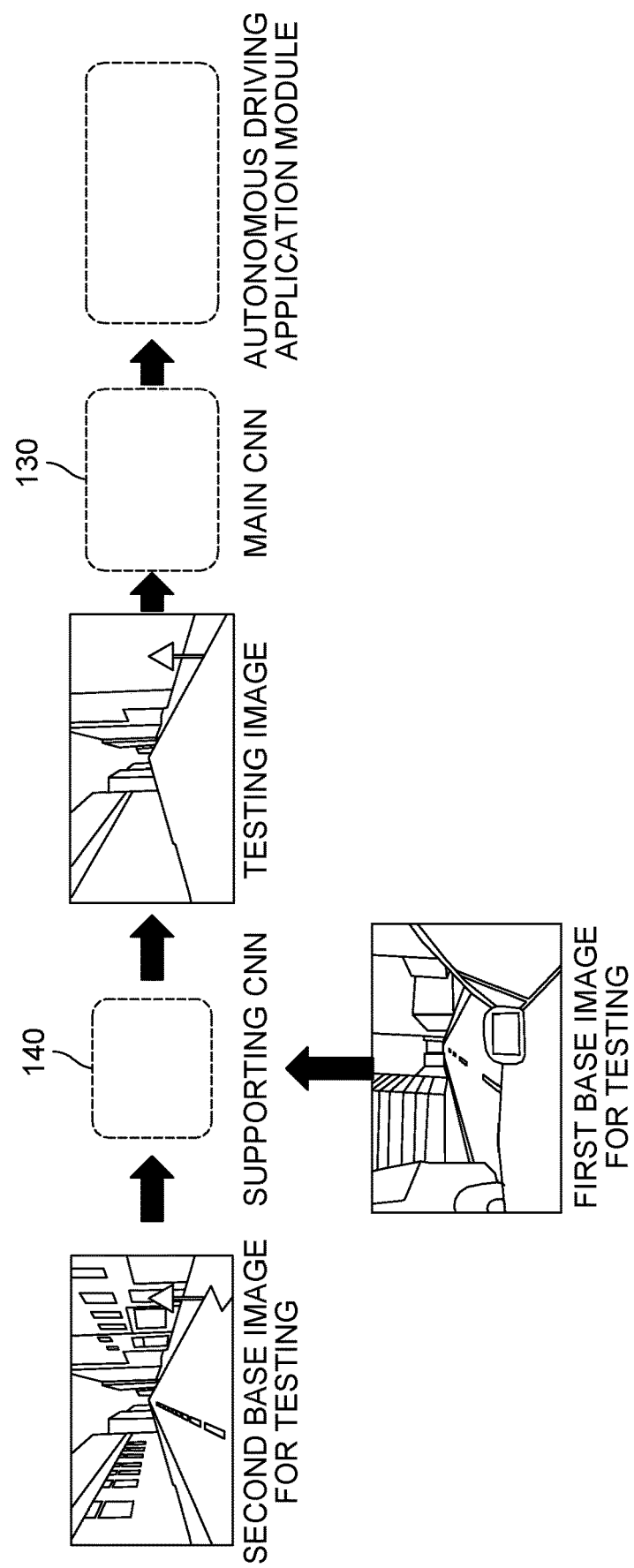
FIG. 4 is a drawing schematically illustrating a flow of a testing method for allowing the CNN for autonomous driving trained in the virtual world to perform the autonomous driving in the real world by the runtime input transformation using the photo style transformation in accordance with one example embodiment of the present disclosure.

FIG. 4 is a drawing schematically illustrating a flow of a testing method for allowing the CNN for autonomous driving trained in the virtual world to perform the autonomous driving in the real world by the runtime input transformation using the photo style transformation in accordance with one example embodiment of the present disclosure.

By referring to FIG. 4, it can be seen that the testing method of the present disclosure includes steps of (i) generating a testing image by referring to at least one first base image for testing corresponding to the virtual driving and at least one second base image for testing acquired in real-time and (ii) inputting the testing image to the trained main CNN 130 to deliver its output, i.e., estimated autonomous driving source information for testing, to the autonomous driving application module. Below, it will be explained more specifically.

That is, on condition that (1) the learning device 100 has acquired at least part of one or more first training images corresponding to a virtual driving for training of a virtual vehicle for training in the prescribed virtual world for training; and (2) the learning device 100 has performed, (b1) as a first training process, a process of (i) instructing the main convolutional layer and the output layer in the main CNN 130 to generate one or more pieces of first estimated autonomous driving source information for training by referring to the first training images, (ii) instructing the main loss layer in the main CNN 130 to (ii-1) generate one or more first main losses by referring to the first estimated autonomous driving source information for training and its corresponding first GT autonomous driving source information and (ii-2) perform backpropagation by using the first main losses, to thereby learn at least part of parameters of the main CNN 130, and (b2) as a second training process, a process of (i) instructing the supporting CNN 140 to generate one or more second training images by referring to at least one first base image for training corresponding to the first training images and one or more second base images for training corresponding to a real driving for training of a real vehicle for training in a real world, (ii) instructing the main convolutional layer and the output layer in the main CNN 130 to generate one or more pieces of second estimated autonomous driving source information for training by referring to the second training images, (iii) instructing the main loss layer in the main CNN 130 to (iii-1) generate one or more second main losses by referring to the second estimated autonomous driving source information for training and its corresponding second Ground-Truth (GT) autonomous driving source information and (iii-2) perform backpropagation by using the second main losses, to thereby learn at least part of parameters of the main CNN 130, a testing device may instruct the supporting CNN 140 to generate a testing image by referring to (i) at least one first base image for testing corresponding to a virtual driving for testing of a virtual vehicle for testing in a virtual world for testing, and (ii) at least one second base image for testing acquired through at least one camera for testing installed to a real vehicle for testing in the real world, interworking with the testing device.

Thereafter, the testing device may instruct the main convolutional layer and the output layer in the main CNN 130 to generate estimated autonomous driving source information by referring to the testing image.

Then, the testing device may deliver the estimated autonomous driving source information for testing to the autonomous driving application module, to thereby support the autonomous driving of the real vehicle for testing. Herein, the autonomous driving application module may use segmentation information or object detection information on the testing image, included in the estimated autonomous driving source information for testing, to perform the autonomous driving. However, since the autonomous driving application module itself is not mainly in the scope of the present disclosure, more specific explanation is omitted.

When the testing method is performed, different from the learning method, a latency is very important. Thus, the first base image for testing, which is singular, may be fixed, and input images which has been acquired through the camera for testing in real-time to the supporting CNN 140 similarly to the second base image for testing. That is, the testing device, if an additional second base image for testing is acquired through the camera for testing at a (T+1)-th timing after a T-th timing when the second base image for testing has been acquired, instructing the supporting CNN to (i) generate an additional testing image by referring to the first base image for testing and the additional second base image for testing and (ii) generate additional estimated autonomous driving source information for testing by using the additional testing image.

By using the learning method and the testing method of the present disclosure, an autonomous vehicle, with a lower cost for a labelling but higher performance in the autonomous driving, can be provided.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for training a main Convolutional Neural Network (CNN) to be used for performing an autonomous driving, by using at least one virtual image and at least one style-transformed real image, which has been transformed from at least one real image to an image whose style corresponds to a style of an image of a prescribed virtual world, comprising steps of:
   (a) a learning device acquiring at least part of one or more first training images corresponding to a virtual driving of a virtual vehicle in the prescribed virtual world; and
   (b) the learning device performing, (b1) as a first training process, processes of (i) instructing a main convolutional layer and an output layer in the main CNN to generate one or more pieces of first estimated autonomous driving source information by referring to the first training images, (ii) instructing a main loss layer in the main CNN to (ii-1) generate one or more first main losses by referring to the first estimated autonomous driving source information and its corresponding first Ground-Truth (GT) autonomous driving source information and (ii-2) perform backpropagation by using the first main losses, to thereby learn at least part of parameters of the main CNN, and (b2) as a second training process, processes of (i) instructing a supporting CNN to generate one or more second training images by referring to at least one first base image corresponding to the first training images and one or more second base images corresponding to a real driving of a real vehicle in a real world, (ii) instructing the main convolutional layer and the output layer in the main CNN to generate one or more pieces of second estimated autonomous driving source information by referring to the second training images, (iii) instructing the main loss layer in the main CNN to (iii-1) generate one or more second main losses by referring to the second estimated autonomous driving source information and its corresponding second Ground-Truth (GT) autonomous driving source information and (iii-2) perform backpropagation by using the second main losses, to thereby learn at least part of parameters of the main CNN.

2. The method of claim 1, wherein the step of (b2) includes steps of:
   (b21) the learning device instructing a supporting convolutional layer in the supporting CNN to perform (i) a process of generating one or more specific style feature maps by applying at least one supporting CNN operation to the first base image, and (ii) a process of generating one or more specific content feature maps by applying the supporting CNN operation to a specific second base image among the second base images;
   (b22) the learning device (i) instructing the supporting convolutional layer in the supporting CNN to generate one or more first update feature maps by applying the supporting CNN operation to a noise image and (ii) instructing a supporting loss layer in the supporting CNN to (ii-1) generate at least one first update loss by using the first update feature maps, along with the specific style feature maps and the specific content feature maps, and (ii-2) generate at least one first update image by updating the noise image through the first update loss;
   (b23) the learning device (i) instructing the supporting convolutional layer in the supporting CNN to generate one or more K-th update feature maps by applying the supporting CNN operation to a (K−1)-th update image and (ii) instructing the supporting loss layer in the supporting CNN to (ii-1) generate at least one K-th update loss by using the K-th update feature maps, along with the specific style feature maps and the specific content feature maps, and (ii-2) generate at least one K-th update image by updating the (K−1)-th image through the K-th update loss wherein K is an integer from 1 to N; and
   (b24) the learning device outputting an N-th update image, which has been generated by performing the steps of (b22) and (b23), as a specific second training image.

3. The method of claim 2, wherein, at the step of (b22), the learning device instructs the supporting loss layer to perform (i) a process of generating one or more first style losses by using the first update feature maps and the specific style feature maps and (ii) a process of generating one or more first content losses by using the first update feature maps and the specific content feature maps, to thereby generate the first update loss including the first style losses and the first content losses.

4. The method of claim 2, wherein, at the step of (b22), the learning device instructs the supporting loss layer to update the noise image by using the first update loss in a gradient-descent scheme, to thereby (i) make a style characteristic of the first update image to be more similar to that of the specific first base image than that of the noise image, (ii) make a content characteristic of the first update image to be more similar to that of the specific second base image than that of the noise image.

5. The method of claim 1, wherein, at the step of (b), the learning device (i) instructs the main CNN to perform the first training process by using a specific number of the first training images and their corresponding said first GT autonomous driving source information to learn the parameters thereof, and then (ii) instructs the main CNN to perform the second training process by using the second training images and their corresponding said second GT autonomous driving source information to fine-tune the parameters thereof.

6. The method of claim 1, wherein, at the step of (b), the learning device (i) instructs the main CNN to perform the first training process by using (i-1) one or more specific first training images among the first training images wherein a ratio of the number of the specific first training images to a specific number, which has been set by a manger, is prescribed and (i-2) their corresponding part of the first GT autonomous driving source information, to thereby initially learn the parameters thereof, and then (ii) instructs the main CNN to perform the second training process by using the second training images and their corresponding second GT autonomous driving source information along with the first training images and their corresponding first GT autonomous driving source information, to thereby relearn the parameters thereof.

7. The method of claim 1, wherein, at the step of (b2), the first base image is selected among the first training images and the second base images are acquired through at least one camera installed to the real vehicle which photographs real driving circumstance corresponding to the real vehicle, and wherein, if said at least one first base image is singular, each of the second training images corresponds to each of the second base images.

8. The method of claim 1, wherein, at the step of (b1), the learning device instructs (i) one or more main convolutional neurons of the main convolutional layer in the main CNN to repeat processes of (i-1) applying at least one main convolutional operation to its inputted value by using its own parameter and (i-2) delivering its output to its next autonomous driving neuron, to thereby generate a first autonomous driving feature map, and (ii) the output layer in the main CNN to generate the first estimated autonomous driving source information by applying at least one output operation to the first autonomous driving feature map, to thereby apply the main CNN operation to the first training images.

9. A method for testing a main Convolutional Neural Network (CNN) to be used for performing an autonomous driving, trained by using at least one virtual image and at least one style-transformed real image, which has been transformed from at least one real image to an image whose style corresponds to a style of an image of a prescribed virtual world, comprising steps of:
(a) on condition that (1) a learning device has acquired at least part of one or more first training images corresponding to a virtual driving for training of a virtual vehicle for training in the prescribed virtual world for training; and (2) the learning device has performed, (b1) as a first training process, processes of (i) instructing a main convolutional layer and an output layer in the main CNN to generate one or more pieces of first estimated autonomous driving source information for training by referring to the first training images, (ii) instructing a main loss layer in the main CNN to (ii-1) generate one or more first main losses by referring to the first estimated autonomous driving source information for training and its corresponding first Ground-Truth (GT) autonomous driving source information and (ii-2) perform backpropagation by using the first main losses, to thereby learn at least part of parameters of the main CNN, and (b2) as a second training process, processes of (i) instructing a supporting CNN to generate one or more second training images by referring to at least one first base image for training corresponding to the first training images and one or more second base images for training corresponding to a real driving for training of a real vehicle for training in a real world, (ii) instructing the main convolutional layer and the output layer in the main CNN to generate one or more pieces of second estimated autonomous driving source information for training by referring to the second training images, (iii) instructing the main loss layer in the main CNN to (iii-1) generate one or more second main losses by referring to the second estimated autonomous driving source information for training and its corresponding second Ground-Truth (GT) autonomous driving source information and (iii-2) perform backpropagation by using the second main losses, to thereby learn at least part of parameters of the main CNN, a testing device instructing the supporting CNN to generate a testing image by referring to (i) at least one first base image for testing corresponding to a virtual driving for testing of a virtual vehicle for testing in a virtual world for testing, and (ii) at least one second base image for testing acquired through at least one camera for testing installed to a real vehicle for testing in the real world, interworking with the testing device;

(b) the testing device instructing the main convolutional layer and the output layer in the main CNN to generate estimated autonomous driving source information for testing by referring to the testing image.

10. The method of claim 9, further comprising a step of:
(c) the testing device delivering the estimated autonomous driving source information for testing to an autonomous driving application module, to thereby support an autonomous driving of the real vehicle for testing.

11. The method of claim 9, wherein the step of (a) includes steps of:
(a1) the testing device instructing a supporting convolutional layer in the supporting CNN to perform (i) a process of generating one or more style feature maps for testing by applying at least one supporting CNN operation to the first base image for testing, and (ii) a process of generating one or more content feature maps for testing by applying the supporting CNN operation to the second base image for testing;
(a2) the testing device (i) instructing the supporting convolutional layer in the supporting CNN to generate one or more first update feature maps for testing by applying the supporting CNN operation to a noise image for testing and (ii) instructing a supporting loss layer in the supporting CNN to (ii-1) generate at least one first update loss for testing by using the first update feature maps for testing, along with the style feature maps for testing and the content feature maps for testing, and (ii-2) generate at least one first update image for testing by updating the noise image for testing through the first update loss for testing;
(a3) the testing device (i) instructing the supporting convolutional layer in the supporting CNN to generate one or more K-th update feature maps for testing by applying the supporting CNN operation to a (K−1)-th update image for testing and (ii) instructing the supporting loss layer in the supporting CNN to (ii-1) generate at least one K-th update loss for testing by using the K-th update feature maps for testing, along with the style feature maps for testing and the content feature maps for testing, and (ii-2) generate at least one K-th update image for testing by updating the (K−1)-th image for testing through the K-th update loss for testing wherein K is an integer from 1 to N; and
(a4) the testing device outputting an N-th update image for testing, which has been generated by performing the steps of (a2) and (a3), as the testing image.

12. The method of claim 9, after a step of (b), further comprising a step of:
(d) the testing device, if an additional second base image for testing is acquired through the camera for testing at a (T+1)-th timing after a T-th timing when the second base image for testing has been acquired, instructing the supporting CNN to (i) generate an additional testing image by referring to the first base image for testing and the additional second base image for testing and (ii) generate additional estimated autonomous driving source information for testing by using the additional testing image.

13. The method of claim 9, wherein, at the step of (b), the testing device instructs (i) one or more main convolutional neurons of the main convolutional layer in the main CNN to repeat processes of (i-1) applying at least one main convolutional operation to its inputted value by using its own parameter and (i-2) delivering its output to its next autonomous driving neuron, to thereby generate a autonomous driving feature map for testing, and (ii) the output layer in the main CNN to generate the estimated autonomous driving source information for testing by applying at least one output operation to the autonomous driving feature map for testing, to thereby apply the main CNN operation to the testing images.

14. A device for training a main Convolutional Neural Network (CNN) to be used for performing an autonomous driving, by using at least one virtual image and at least one style-transformed real image, which has been transformed from at least one real image to an image whose style corresponds to a style of an image of a prescribed virtual world, comprising:
at least one memory that stores instructions; and
at least one processor configured to execute the instructions to perform processes of: (I) acquiring at least part of one or more first training images corresponding to a virtual driving of a virtual vehicle in the prescribed virtual world; and (II) performing, (I1) as a first training process, a process of (i) instructing a main convolutional layer and an output layer in the main CNN to generate one or more pieces of first estimated autonomous driving source information by referring to the first training images, (ii) instructing a main loss layer in the main CNN to (ii-1) generate one or more first main losses by referring to the first estimated autonomous driving source information and its corresponding first Ground-Truth (GT) autonomous driving source information and (ii-2) perform backpropagation by using the first main losses, to thereby learn at least part of parameters of the main CNN, and (I2) as a second training process, a process of (i) instructing a supporting CNN to generate one or more second training images by referring to at least one first base image corresponding to the first training images and one or more second base images corresponding to a real driving of a real vehicle in a real world, (ii) instructing the main convolutional layer and the output layer in the main CNN to generate one or more pieces of second estimated autonomous driving source information by referring to the second training images, (iii) instructing the main loss layer in the main CNN to (iii-1) generate one or more second main losses by referring to the second estimated autonomous driving source information and its corresponding second Ground-Truth (GT) autonomous driving source information and (iii-2) perform backpropagation by using the second main losses, to thereby learn at least part of parameters of the main CNN.

15. The device of claim 14, wherein the process of (I2) includes processes of:
(I21) instructing a supporting convolutional layer in the supporting CNN to perform (i) a process of generating one or more specific style feature maps by applying at least one supporting CNN operation to the first base image, and (ii) a process of generating one or more specific content feature maps by applying the supporting CNN operation to a specific second base image among the second base images;
(I22) (i) instructing the supporting convolutional layer in the supporting CNN to generate one or more first update feature maps by applying the supporting CNN operation to a noise image and (ii) instructing a supporting loss layer in the supporting CNN to (ii-1) generate at least one first update loss by using the first update feature maps, along with the specific style feature maps and the specific content feature maps, and
(ii-2) generate at least one first update image by updating the noise image through the first update loss;
(I23) (i) instructing the supporting convolutional layer in the supporting CNN to generate one or more K-th update feature maps by applying the supporting CNN operation to a (K−1)-th update image and (ii) instructing the supporting loss layer in the supporting CNN to (ii-1) generate at least one K-th update loss by using the K-th update feature maps, along with the specific style feature maps and the specific content feature maps, and (ii-2) generate at least one K-th update image by updating the (K−1)-th image through the K-th update loss wherein K is an integer from 1 to N; and
(I24) outputting an N-th update image, which has been generated by performing the processes of (I22) and (I23), as a specific second training image.

16. The device of claim 15, wherein, at the process of (I22), the processor instructs the supporting loss layer to perform (i) a process of generating one or more first style losses by using the first update feature maps and the specific style feature maps and (ii) a process of generating one or more first content losses by using the first update feature maps and the specific content feature maps, to thereby generate the first update loss including the first style losses and the first content losses.

17. The device of claim 15, wherein, at the process of (I22), the processor instructs the supporting loss layer to update the noise image by using the first update loss in a gradient-descent scheme, to thereby (i) make a style characteristic of the first update image to be more similar to that of the specific first base image than that of the noise image, (ii) make a content characteristic of the first update image to be more similar to that of the specific second base image than that of the noise image.

18. The device of claim 14, wherein, at the process of (II), the processor (i) instructs the main CNN to perform the first training process by using a specific number of the first training images and their corresponding said first GT autonomous driving source information to learn the parameters thereof, and then (ii) instructs the main CNN to perform the second training process by using the second training images and their corresponding said second GT autonomous driving source information to fine-tune the parameters thereof.

19. The device of claim 14, wherein, at the process of (II), the processor (i) instructs the main CNN to perform the first training process by using (i-1) one or more specific first training images among the first training images wherein a ratio of the number of the specific first training images to a specific number, which has been set by a manager, is prescribed and (i-2) their corresponding part of the first GT autonomous driving source information, to thereby initially learn the parameters thereof, and then instructs the main CNN to perform the second training process by using the second training images and their corresponding second GT autonomous driving source information along with the first training images and their corresponding first GT autonomous driving source information, to thereby relearn the parameters thereof.

20. The device of claim 14, wherein, at the process of (I2), the first base image is selected among the first training images and the second base images are acquired through at least one camera installed to the real vehicle which photographs real driving circumstance corresponding to the real vehicle, and wherein, if said at least one first base image is singular, each of the second training images corresponds to each of the second base images.

21. The device of claim 14, wherein, at the process of (I1), the processor instructs (i) one or more main convolutional neurons of the main convolutional layer in the main CNN to repeat processes of (i-1) applying at least one main convolutional operation to its inputted value by using its own parameter and (i-2) delivering its output to its next autonomous driving neuron, to thereby generate a first autonomous driving feature map, and (ii) the output layer in the main CNN to generate the first estimated autonomous driving source information by applying at least one output operation to the first autonomous driving feature map, to thereby apply the main CNN operation to the first training images.

22. A device for testing a main Convolutional Neural Network (CNN) to be used for performing an autonomous driving, trained by using at least one virtual image and at least one style-transformed real image, which has been transformed from at least one real image to an image whose style corresponds to a style of an image of a prescribed virtual world, comprising:
at least one memory that stores instructions; and
at least one processor configured to execute the instructions to perform processes of: (I) on condition that (1) a learning device has acquired at least part of one or more first training images corresponding to a virtual driving for training of a virtual vehicle for training in the prescribed virtual world for training; and (2) the learning device has performed, (b1) as a first training process, a process of (i) instructing a main convolutional layer and an output layer in the main CNN to generate one or more pieces of first estimated autonomous driving source information for training by referring to the first training images, (ii) instructing a main loss layer in the main CNN to (ii-1) generate one or more first main losses by referring to the first estimated autonomous driving source information for training and its corresponding first Ground-Truth (GT) autonomous driving source information and (ii-2) perform backpropagation by using the first main losses, to thereby learn at least part of parameters of the main CNN, and (b2) as a second training process, a process of (i) instructing a supporting CNN to generate one or more second training images by referring to at least one first base image for training corresponding to the first training images and one or more second base images for training corresponding to a real driving for training of a real vehicle for training in a real world, (ii) instructing the main convolutional layer and the output layer in the main CNN to generate one or more pieces of second estimated autonomous driving source information for training by referring to the second training images, (iii) instructing the main loss layer in the main CNN to (iii-1) generate one or more second main losses by referring to the second estimated autonomous driving source information for training and its corresponding second Ground-Truth (GT) autonomous driving source information and (iii-2) perform backpropagation by using the second main losses, to thereby learn at least part of parameters of the main CNN, instructing the supporting CNN to generate a testing image by referring to (i) at least one first base image for testing corresponding to a virtual driving for testing of a virtual vehicle for testing in a virtual world for testing, and (ii) at least one second base image for testing acquired through at least one camera for testing installed to a real vehicle for testing in the real world, interworking with the testing device; (II) instructing the main convolutional layer and the output layer in the main CNN to generate estimated autonomous driving source information by referring to the testing image.

23. The device of claim 22, wherein the processor further performs a process of:
(III) delivering the estimated autonomous driving source information for testing to an autonomous driving application module, to thereby support an autonomous driving of the real vehicle for testing.

24. The device of claim 22, wherein the process of (I) includes processes of:
(I1 instructing a supporting convolutional layer in the supporting CNN to perform (i) a process of generating one or more style feature maps for testing by applying at least one supporting CNN operation to the first base image for testing, and (ii) a process of generating one or more content feature maps for testing by applying the supporting CNN operation to the second base image for testing;
(I2) (i) instructing the supporting convolutional layer in the supporting CNN to generate one or more first update feature maps for testing by applying the supporting CNN operation to a noise image for testing and (ii) instructing a supporting loss layer in the supporting CNN to (ii-1) generate at least one first update loss for testing by using the first update feature maps for testing, along with the style feature maps for testing and the content feature maps for testing, and (ii-2) generate at least one first update image for testing by updating the noise image for testing through the first update loss for testing;
(I3) (i) instructing the supporting convolutional layer in the supporting CNN to generate one or more K-th update feature maps for testing by applying the supporting CNN operation to a (K−1)-th update image for testing and (ii) instructing the supporting loss layer in the supporting CNN to (ii-1) generate at least one K-th update loss for testing by using the K-th update feature maps for testing, along with the style feature maps for testing and the content feature maps for testing, and (ii-2) generate at least one K-th update image for testing by updating the (K−1)-th image for testing through the K-th update loss for testing wherein K is an integer from 1 to N; and
(I4) outputting an N-th update image for testing, which has been generated by performing the processes of (a2) and (a3), as the testing image.

25. The device of claim 22, wherein, after a process of (II), the processor further performs a process of:
(IV) if an additional second base image for testing is acquired through the camera for testing at a (T+1)-th timing after a T-th timing when the second base image for testing has been acquired, instructing the supporting CNN to (i) generate an additional testing image by referring to the first base image for testing and the additional second base image for testing and (ii) generate additional estimated autonomous driving source information for testing by using the additional testing image.

26. The device of claim 22, wherein, at the process of (II), the processor instructs (i) one or more main convolutional neurons of the main convolutional layer in the main CNN to repeat processes of (i-1) applying at least one main convolutional operation to its inputted value by using its own parameter and (i-2) delivering its output to its next autonomous driving neuron, to thereby generate a autonomous driving feature map for testing, and (ii) the output layer in the main CNN to generate the estimated autonomous driving source information for testing by applying at least one output operation to the autonomous driving feature map for testing, to thereby apply the main CNN operation to the testing images.

\* \* \* \* \*